(12) United States Patent
Santana

(10) Patent No.: US 9,601,915 B2
(45) Date of Patent: Mar. 21, 2017

(54) ELECTRONIC SAFETY SHUTOFF WITH DUAL REDUNDANCY

(71) Applicant: Luis Santana, Miami, FL (US)

(72) Inventor: Luis Santana, Miami, FL (US)

( * ) Notice: Subject to any disclaimer, the term of this patent is extended or adjusted under 35 U.S.C. 154(b) by 16 days.

(21) Appl. No.: 14/527,324

(22) Filed: Oct. 29, 2014

(65) Prior Publication Data

US 2015/0116884 A1 Apr. 30, 2015

Related U.S. Application Data

(60) Provisional application No. 61/897,096, filed on Oct. 29, 2013.

(51) Int. Cl.
| | |
|---|---|
| *H02H 5/04* | (2006.01) |
| *H02H 1/00* | (2006.01) |
| *H02H 3/08* | (2006.01) |

(52) U.S. Cl.
CPC ............ *H02H 1/0007* (2013.01); *H02H 3/08* (2013.01); *H02H 5/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,689,888 A | * | 9/1972 | Wootton | G08B 25/009 340/521 |
| 3,848,231 A | * | 11/1974 | Wootton | G08B 25/10 340/521 |
| 5,726,633 A | * | 3/1998 | Wiemeyer | G08B 29/183 340/522 |
| 5,946,303 A | * | 8/1999 | Watson | H04Q 9/00 340/3.43 |
| 6,661,346 B1 | * | 12/2003 | Wood | G08B 21/10 340/601 |
| 6,778,882 B2 | * | 8/2004 | Spool | G05B 19/042 700/286 |
| 7,068,177 B2 | * | 6/2006 | Tice | G08B 17/00 219/446.1 |
| 7,154,402 B2 | * | 12/2006 | Dayoub | G08B 17/10 340/628 |
| 7,327,247 B2 | * | 2/2008 | Tice | G08B 29/20 340/309.16 |
| 7,483,964 B1 | * | 1/2009 | Jackson | H04L 12/2809 455/41.1 |
| 7,969,296 B1 | * | 6/2011 | Stell | G08B 17/10 340/522 |

(Continued)

FOREIGN PATENT DOCUMENTS

WO WO 2014073970 A2 * 5/2014 ............ A62C 5/006

*Primary Examiner* — Ronald W Leja
(74) *Attorney, Agent, or Firm* — Robert M. Downey, P.A.

(57) ABSTRACT

Electronic safety shutoff with dual redundancy is provided for use in combination with an electronic device to prevent fire, explosion, electrocution or shock. In one embodiment, four sensors, including two smoke sensors and two temperature sensors provide input to the logic gate circuit. The logic gate circuit determines the output signal to maintain power or interrupt power. Any combination of two or more sensors triggering will activate a power interrupting signal by the logic gate circuit, thereby activating an emergency power shutoff.

2 Claims, 1 Drawing Sheet

(56) References Cited

U.S. PATENT DOCUMENTS

| | | | | |
|---|---|---|---|---|
| 2004/0226726 A1* | 11/2004 | Holland | .................. | A62C 3/07 |
| | | | | 169/62 |
| 2005/0078003 A1* | 4/2005 | King | .................. | G08B 29/183 |
| | | | | 340/506 |
| 2007/0152709 A1* | 7/2007 | Gerhart | .................. | G05B 9/02 |
| | | | | 326/41 |
| 2012/0086402 A1* | 4/2012 | Carder | .................. | H02J 1/108 |
| | | | | 320/118 |
| 2015/0116884 A1* | 4/2015 | Santana | .............. | H02H 1/0007 |
| | | | | 361/103 |
| 2015/0269821 A1* | 9/2015 | Haynes | ................. | G08B 17/10 |
| | | | | 340/532 |

\* cited by examiner

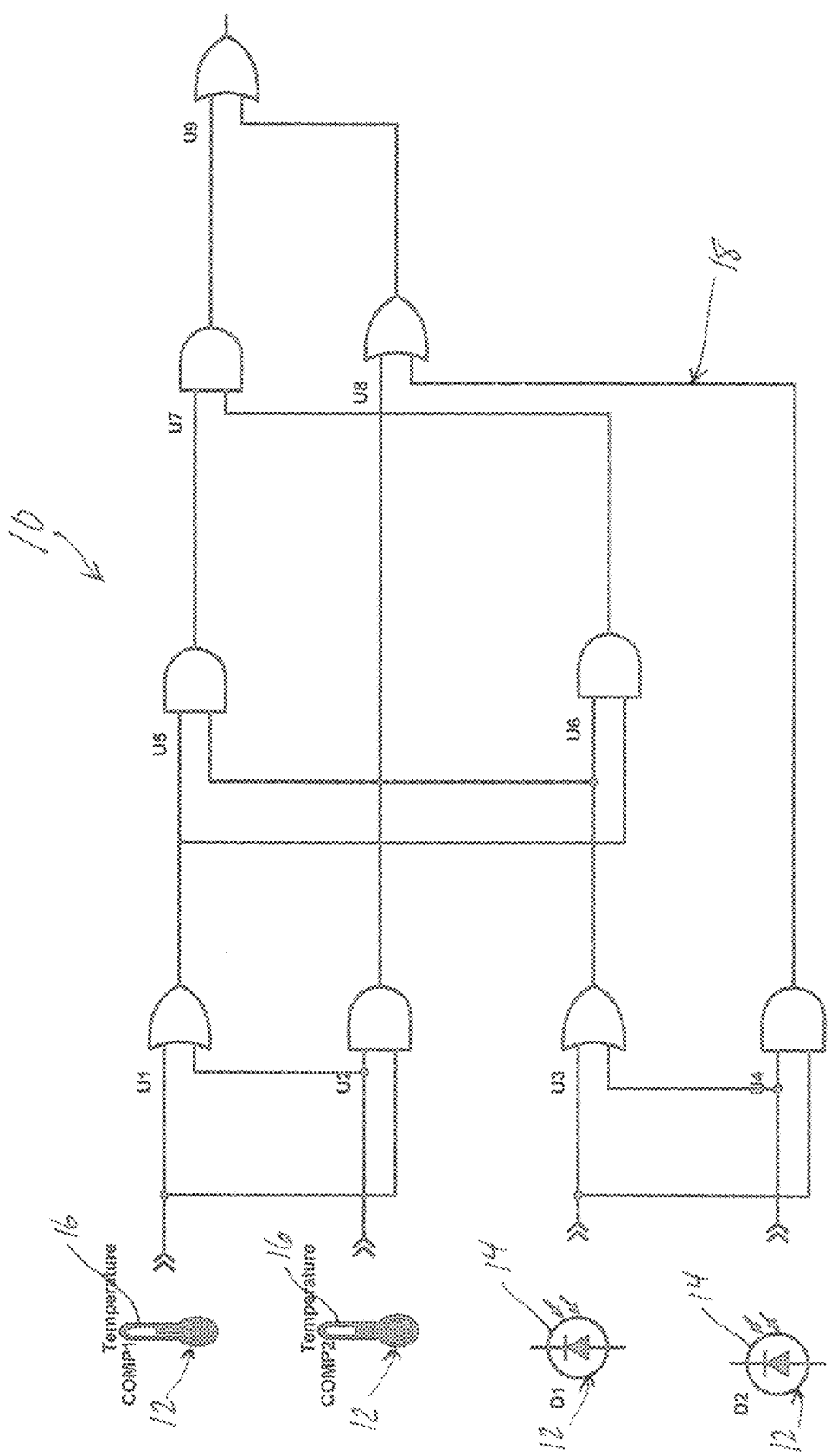

ELECTRONIC SAFETY SHUTOFF WITH DUAL REDUNDANCY

BACKGROUND OF THE INVENTION

Field of the Invention

The present invention relates to electrical utility meters and, more particularly, to an electrical utility meter including a logic circuit adapted to shut off in response to at least two sensors being triggered.

Discussion of the Related Art

The electrical utility meters used to measure electrical consumption by utility companies in commercial and/or residential occupancies present a potential life, safety, fire and explosion hazard. Generally, electrical meters, as well as appliances, cars and other electronic apparatuses that present a potential fire hazard, only include a circuit breaker or fuse.

Accordingly, there exists a need for an electronic safety shutoff design in an electrical utility meter for shutting off power if smoke is sensed and/or if a particular temperature is sensed, thereby preventing further damage and increasing safety.

This technology can be used in electrical utility meters as well as other household appliances and electric cars. Any energized device represents a potential fire/safety hazard. The electronic safety shutoff described herein utilizes dual redundancy and will make any energized equipment safer.

SUMMARY OF THE INVENTION

The present invention is directed to an electronic safety shutoff with dual redundancy for use in combination with an electronic device to prevent fire, explosion, electrocution or shock. In one embodiment, four sensors, including two smoke sensors and two temperature sensors provide input to the logic gate circuit. The logic gate circuit determines the output signal to maintain power or interrupt power. Any combination of two or more sensors triggering will activate a power interrupting signal by the logic gate circuit, thereby activating an emergency power shutoff.

BRIEF DESCRIPTION OF THE DRAWINGS

For a fuller understanding of the nature of the present invention, reference should be made to the following detailed description taken in conjunction with the accompanying drawing in which:

FIG. 1 is a schematic circuit diagram of the device components, including four sensors and a logic gate circuit.

Like reference numerals refer to like parts throughout the several views of the drawings.

DETAILED DESCRIPTION OF THE INVENTION

Referring to the several views of the drawings, the electronic safety shutoff of the present invention is shown and is generally indicated as 10. Presently utilized electrical utility meters used to measure electrical consumption by utility companies in commercial and/or residential occupancies present a potential life, safety, fire and explosion hazard.

The electronic safety shutoff 10 provides a double action safety/emergency shutoff/disconnect including a plurality of sensors 12, with dual redundancy to prevent erroneous shut off. If a single sensor 12 should fail, power will remain on (dual redundancy). Conversely, actual over temperature and/or smoke detection will trigger more than one sensor 12 and immediately disconnect the power to prevent further damage, burning, melting etc. This design will kill power if smoke or overheating temperature is sensed, thereby preventing further damage and significantly increasing safety. In a preferred embodiment, one or more of the sensors 12 is a smoke detecting sensor 14 and one or more of the sensors 12 is a temperature sensor 16 set to trigger if a predetermined temperature is detected.

In one embodiment, four sensors 12, including two smoke sensors 14 and two temperature sensors 16 provide input to the logic gate circuit 18. The logic gate circuit 18 determines the output signal to maintain power or interrupt power. Any combination of two or more sensors 12 triggering will activate an interrupt signal by the logic gate circuit 18, thereby activating an emergency power shutoff.

If one of the four sensors 12 fails or is triggered, the power will remain uninterrupted. Two sensors 12 need to be activated for shutoff to occur. This will increase reliability, safety and prevent false alarms/unnecessary power interruptions. In case of actual overheat or smoke from any component failure, the unit will shut off power to the equipment. All sensors 12 will trigger in a failure situation.

The electronic safety shutoff 10 can be manufactured using readily available materials and current technology. Moreover, the shutoff 10 can be assembled into new meters or easily retrofitted onto existing meters. Fabrication will require all existing components. For smart meters, all components are located inside the meter or meter box. For other applications, the sensors 12 can be remotely placed depending on appliance, vehicle etc.

In one embodiment, a manual external switch may be added with a fire department key for safety of fire personnel. Additionally, a circuit breaker or fusible link may be included to prevent over current.

While the present invention has been shown and described in accordance with several preferred and practical embodiments thereof, it is recognized that departures from the instant disclosure are fully contemplated within the spirit and scope of the invention as defined in the following claims and as interpreted under the Doctrine of Equivalence.

What is claimed is:

1. An electronic safety shutoff for use in combination with an electronic device, said electronic safety shutoff comprising:
   a plurality of sensors each being structured and disposed for detecting the presence of a fire, and said plurality of sensors including at least two smoke detecting sensors and at least two temperature sensors; and
   a logic gate circuit in communication with said plurality of sensors, and said logic gate circuit being structured and disposed for delivering a power interrupting signal to the electronic device when at least one of said smoke detecting sensors and at least one of said temperature sensors are both triggered.

2. An electronic safety shutoff for use in combination with an electronic device, said electronic safety shutoff comprising:
   a plurality of sensors each being structured and disposed for detecting the presence of a fire, and said plurality of sensors including at least two smoke detecting sensors and at least two temperature sensors; and
   a logic gate circuit in communication with said plurality of sensors, and said logic gate circuit being structured and disposed for delivering a power interrupting signal to the electronic device when at least two of said smoke detecting sensors and temperature sensors are triggered.

\* \* \* \* \*